United States Patent [19]

Wackerle et al.

[11] 4,385,957
[45] May 31, 1983

[54] METHOD FOR HEATING A WEBBING REINFORCED BY CARBON FIBERS

[75] Inventors: Peter Wackerle, Ottobrunn; Dieter Franz, Jettenbach, both of Fed. Rep. of Germany

[73] Assignee: Messerschmitt-Boelkow-Blohm GmbH, Munich, Fed. Rep. of Germany

[21] Appl. No.: 165,118

[22] Filed: Jul. 1, 1980

[30] Foreign Application Priority Data

Jul. 13, 1979 [DE] Fed. Rep. of Germany ....... 2928293

[51] Int. Cl.³ ............................................ B29C 19/06
[52] U.S. Cl. ................................ 156/273.9; 29/611;
219/544; 219/545; 264/105; 427/49
[58] Field of Search .................. 29/611; 219/345, 528,
219/541, 543, 544, 545, 549, 553; 338/208, 212;
156/71, 172, 275, 380, 273, 273.9; 264/105, 27;
285/21, 292

[56] References Cited

U.S. PATENT DOCUMENTS

| | | | |
|---|---|---|---|
| 2,559,077 | 7/1951 | Johnson et al. | 219/543 |
| 2,985,860 | 5/1961 | Morey | 219/528 X |
| 3,061,503 | 10/1962 | Gould et al. | 156/275 |
| 3,062,940 | 11/1962 | Bauer et al. | 219/544 |
| 3,094,452 | 6/1963 | Von Riegen et al. | 156/275 |
| 3,146,340 | 8/1964 | Dowey et al. | 219/544 |
| 3,175,895 | 3/1965 | Gibson et al. | 264/105 X |
| 3,349,359 | 10/1967 | Morey | 219/549 X |
| 3,397,303 | 8/1968 | Smith | 219/545 |
| 3,506,519 | 4/1970 | Blumenkranz | 156/275 |
| 3,657,516 | 4/1972 | Fujihara | 219/345 |

FOREIGN PATENT DOCUMENTS

| | | | |
|---|---|---|---|
| 263883 | 4/1962 | Australia | 156/273.9 |
| 1416207 | 9/1965 | France | 219/544 |

Primary Examiner—Volodymyr Y. Mayewsky
Attorney, Agent, or Firm—W. G. Fasse; D. F. Gould

[57] ABSTRACT

A webbing reinforced by carbon fibers is heated during its resin impregnation by passing an electric current through the carbon fibers whereby the carbon fibers act directly as heating mats in a system of layers of fiber reinforced material. Thus, the use of heated molds has been obviated which is of particular advantage especially for large scale structural components, especially if such components have a complicated configuration.

9 Claims, 4 Drawing Figures

METHOD FOR HEATING A WEBBING REINFORCED BY CARBON FIBERS

BACKGROUND OF THE INVENTION

The present invention relates to a method for heating a webbing reinforced by carbon fibers. The present method is especially suitable in connection with the impregnation of fiber compound material webbings by injecting a respective resin into the webbings, particularly where large scale structural components are being manufactured from such webbings, for example, for making boat hulls and the like. The invention is also especially suitable for use in connection with the impregnation and curing of fiber compound material components having complicated shapes regardless of their size.

Particularly in connection with the impregnation of structural components having large surfaces, for example, rotor blades of helicopters and the like, or in connection with structural components having complicated shapes, the problem has been encountered heretofore that it is difficult to properly control the resin flow during the resin injection. This flow control problem is due to the fact that the temperature of the resin at any particular location determines the viscosity of the resin and thus also its flowability. Heretofore efforts have been made to solve this problem by means of expensive and very complicated heated molds for the formation of such fiber reinforced structural components.

Furthermore, placing large scale components into a temperature controlled environment such as a heated closet or autoclave has also its limitations because the space requirements of large scale components frequently exceed the volume of available autoclaves. Therefore, systems requiring relatively high curing or hardening temperatures could not be cured in such heat controlled environments due to their size and/or due to the complicated shape of such structural components. Additionally, the construction of heated molds or heat controlled environments is rather expensive, particularly where the components to be made are prototype components or where it is necessary to make but one structure.

OBJECTS OF THE INVENTION

In view of the above it is the aim of the invention to achieve the following objects singly or in combination:

to provide a method for the manufacturing of fiber compound components or structures of any size and/or shape without the need for heated molds while simultaneously increasing the manufacturing efficiency and making it simpler than was possible heretofore with the use of heated molds or temperature controlled environments;

to use a carbon fiber webbing as a heating medium by passing an electrical current through the individual carbon fibers;

to insulate the carbon fiber webbing from a mold of electrically conducting material by means of a glass fiber webbing;

to substantially reduce the energy required for the manufacturing of such components and to simplify the mold structure;

to improve the localized heat application throughout the structure regardless of its shape and/or size;

to adapt the temperature or heat application control to the localized, individual requirements so that the heat application and the flowability of the resin may be varied in accordance with such requirements; and to minimize heat losses and avoid a heat transport through the mold to the structural component.

SUMMARY OF THE INVENTION

According to the invention there is provided a method for manufacturing fiber compound structural components which are made by resin impregnation, whereby the resin is injected into the webbing which may comprise one or several layers. The required flowability of the resin and its curing is accomplished by a heat application directly through the carbon fiber webbing which is heated by passing an electrical current through the carbon fibers. Thus, the carbon fiber webbing operates directly as an electrical internal heating mat in the structural component which may comprise one or several layers of webbings impregnated by the injected resin. The invention also relates to a component so made.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
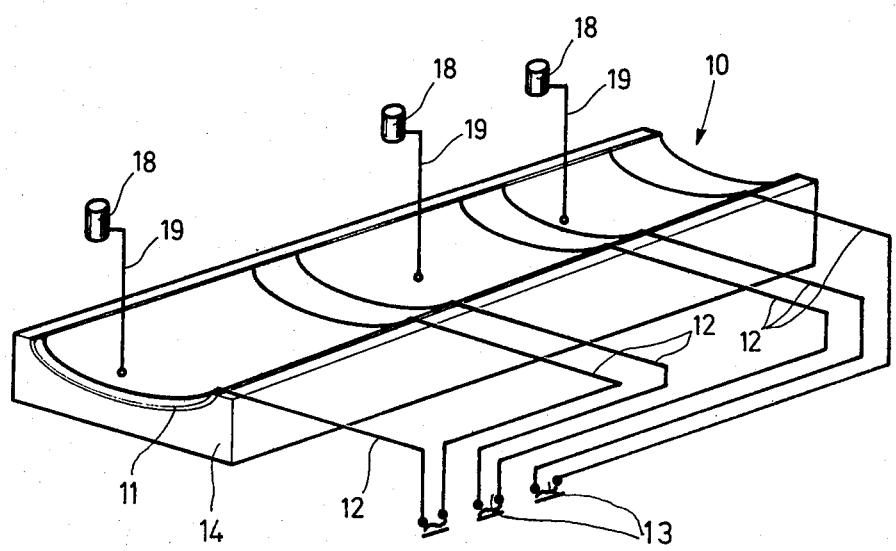
FIG. 1 is a perspective, somewhat schematic illustration of a mold with a carbon fiber webbing inserted therein and connected to electrical power supply.

According to the invention the mold 14 shown in FIG. 1 is not heated. Instead, the invention utilizes the carbon fiber webbing 11 as a heating mat in the structural component to be formed in or on the unheated support mold 14. The structural component 10 comprises the carbon fiber webbing 11 and additional reinforcing fibers, if desired, but not shown in FIG. 1. The reinforcing fibers and the carbon fiber webbing 11 are impregnated by a resin material in a conventional manner. The resin material is contained in containers 18 and injected into the support mold 14 and thus into the laminated structural component 10 through resin injecting conduits 19.

The invention uses the electrical conductivity of the carbon fibers 11 for generating the heat necessary for the curing of the resin, whereby the carbon fiber webbing functions as a heating element similar to a heating coil which forms an integral part of the structural component 10.

Based on the following considerations the present method is quite feasible for the intended purposes. The specific resistance $R_C$ of carbon is known and so are the meter weight MG of an individual carbon fiber and the surface area weight FG of a carbon fiber webbing. Additionally, the density $\gamma$ of the carbon material is also known. Therefore it is possible to calculate the specific resistance $R_F$ of a carbon fiber and the specific resistance $R_G$ of a carbon fiber webbing as follows:

$$R_F = K \cdot R_C(\gamma/MG);\qquad \text{Equation (1)}$$

$$R_G = K \cdot R_C(\gamma/FG);\qquad \text{Equation (2)}$$

In the above equations the factor "k" is an empirical or experimental improvement value supplied by the manufacturer of the respective carbon fibers. For example, carbon-fiber-fabrics manufactured by the Firm Brochier Lyon under the product number G 801 and G 803 have a k factor of about 1.1. Carbon-fiber-fabric sold by the Firm Sigri of Maitingen, West Germany under the product number T 755, and M 40 A have a k factor in the range of about 0.2 to 0.4. The specific resistance of carbon is $$R_C = 40\,\Omega\,\text{mm}^2/\text{m}.$$

The specific density $\gamma$ is given in g/cm³. The linear weight MG is given in g/m. The surface area weight FG is given in g/m². If values for these elements are then inserted into equations (1) and (2) the specific resistance $R_F$ of a carbon fiber is calculated in $\Omega$ /m. Further, the specific resistance $R_G$ is calculated in $\Omega$cm/m. Accordingly, the electrical resistance is calculated from:

$$R = R_F \cdot l/n \qquad \text{Equations (3)}$$

$$R = R_G \cdot l/b \cdot n.$$

In Equations (3)

l (in meters) is the length in the current flow direction, b is the width in centimeters of the layer structure, and n is the number of layers or the number of carbon fiber strands.

In order to avoid overheating of the electrical conductors 12 connecting the power supply source 13 to the carbon fiber webbings 11, the cross-section of these conductors 12 must be specifically calculated so that the cross-sectional area is four to five times larger, relative to the specific resistance, than the cross-sectional area of the fiber structure. The cross sectional area $A_L$, in mm², of the conductors 12 is calculated as:

$$A_L = 4 \ldots 5 A_F (R_L/R_C); \qquad \text{Equation (4)}$$

$$A_L = 4 \ldots 5 A_G (R_L/R_C); \qquad \text{Equation (5)}$$

$A_F$ is the fiber cross-sectional area in mm² and $A_G$ is the cross-sectional area of the webbing structure in mm² these are calculated as follows:

$$A_F = (n \cdot MB/\gamma); \qquad \text{Equation (6)}$$

$$A_G = (n \cdot FG \cdot b/\gamma); \qquad \text{Equation (7)}$$

In order to ascertain how a webbing warms up, experiments have been made by connecting a given carbon fiber webbing to different electrical power supplies. The voltages and electrical currents were measured in order to ascertain an optimal power input for the previously measured resistance R of the webbing relative to direct current power supply and relative to an alternating current power supply. The measured resistance was used as a calculating base for dimensioning the power supply source for different voltage levels. This approach has been found to be satisfactory for a first approximation.

Experiments have further shown that the temperatures which may be obtained by means of a webbing through which a current flows, do not only depend on the electrical values. Rather, the temperatures also depend on the thermal insulation and, in the static range, additionally on the heat capacity of the structure to be heated. It has been found that a good correspondence of the temperature curves actually measured with the calculated temperature curves has been achieved.

Figure 2A:
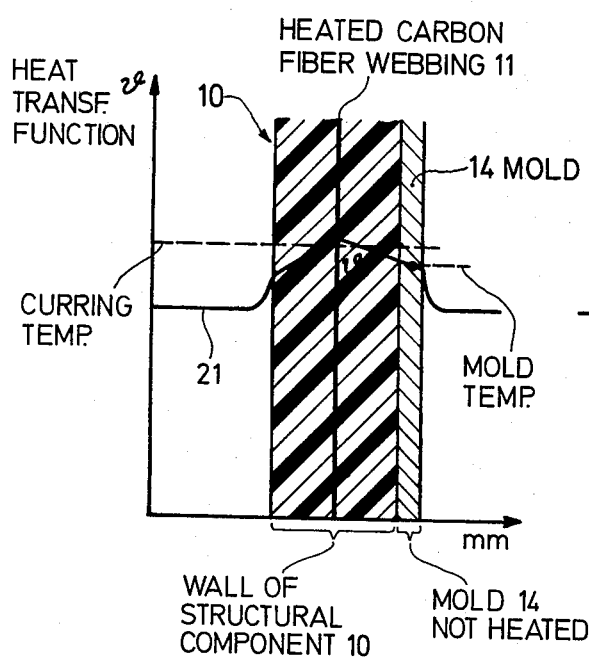
FIG. 2a illustrates the heat transfer $\theta$ as a function of the cross-sectional dimension in millimeters, whereby a section through a structural component is shown which is heated according to the invention.
Figure 2B:
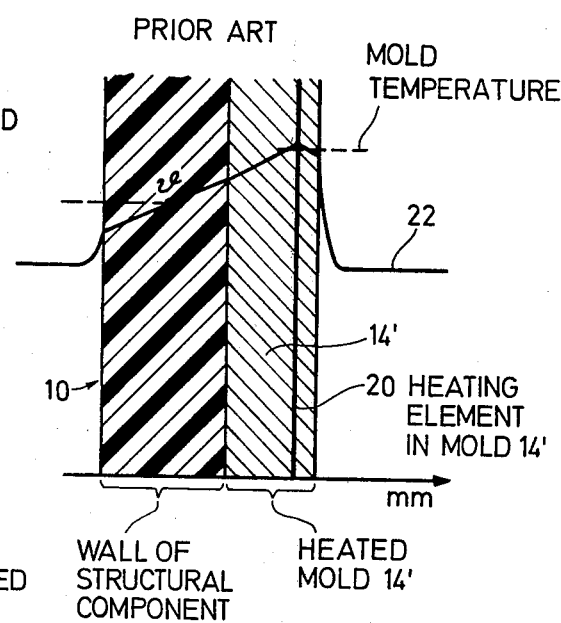
FIG. 2b is a view similar to that of FIG. 2a, however, showing a conventional, heated mold.

Reference is made in this connection to FIGS. 2a and 2b in which the heat transfer $\theta$ is plotted as a function of the dimension or thickness in mm, whereby the thickness corresponds to the wall thickness of the structural component plus the wall thickness of the mold. The mold 14 is not heated according to the invention in FIG. 2a. According to the prior art the mold 14' is heated by a separate heating means or elements 20 as shown in FIG. 2b. According to the invention the curing of the structural component 10 is accomplished by heating the carbon fiber webbing 11 by passing an electrical current of appropriate size through the webbing 11, whereby the temperature or heat distribution curve 21 is established. The curing temperature is indicated by a horizontal dashed line in FIGS. 2a and 2b. The webbing 11 is heated sufficiently to raise the temperature to a peak which coincides with the location of the webbing 11. The temperature decreases outwardly from the position of the webbing 11, but heats the wall of the structural component 10 sufficiently to assure a complete curing.

FIG. 2b shows that in the prior art it was necessary to heat the mold 14' to a mold temperature sufficiently above the curing temperature because of the temperature decrease from the location of the heating element 20 outwardly through the structural component 10 as indicated by the curve 22. It will be noted that FIG. 2b requires a substantially higher peak temperature and hence substantially more energy than the arrangement of FIG. 2a according to the invention.

Figure 3:
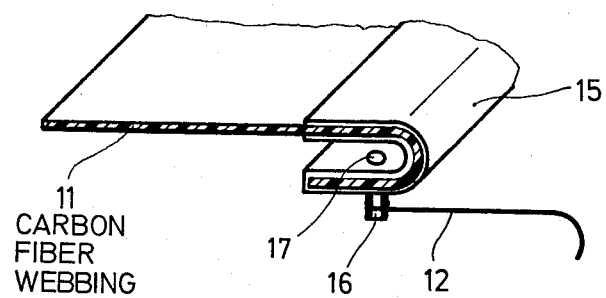
FIG. 3 shows a perspective view of an electrical connection between a power supply conductor and a carbon fiber webbing.

FIG. 3 shows one possible embodiment for connecting an a.c. or d.c. power supply 13 through a conductor 12 to the carbon fiber webbing 11 by means of an edge connector 15 which may, for example, be a channel 15 of U-shaped cross-section of an electrically conducting material such as copper or aluminum or the like. The channel 15 may be mechanically and electrically connected to the webbing 11 by rivets 17 which simultaneously may form a terminal 16. The webbing 11 may be folded into the channel 15 and the mechanical connection may be accomplished in various ways other than the mentioned riveting. For example, a soldered or screw connection may be used. The conductor 12 and the conductor channel 15 will be calculated in their cross-sectional areas in accordance with the equations (4) to (7) set forth above.

The power supply sources 13 preferably provide a voltage of about 65 volts to avoid electrical accidents. It has been found that, for example, welding transformers are well suited for the present purposes due to their efficiency and due to the protective features of such welding transformers.

If in addition to the electrically conducting carbon webbing other electrically conducting webbings are used, the carbon webbing must be electrically insulated from any other webbings and also from the mold, if the latter is made of electrically conducting material for an improved heat distribution, for example, the mold 14' shown in FIG. 2b may be made of aluminum. In that instance, the carbon fiber webbing could be insulated from the electrically conducting mold by a glass fiber webbing. A glass fiber webbing of the product number 92140, manufactured by Interglas Ulm West-Germany is suitable for the present purpose. Similarly, the conducting channels 15 are also to be insulated relative to the electrically conducting mold.

Experiments have shown that the temperature throughout the structural component 10 may easily be controlled for the curing operation and for the resin flow. It is believed that the present curing utilizes the heating energy more efficiently than any prior art curing method, especially in connection with the curing of large surface areas. The energy costs and the costs for the molds and other forming devices has been substantially reduced.

Other advantages of the invention are seen in the preheating of the webbing, whereby it becomes possible to maintain the viscosity of the resin substantially constant already at the beginning of the manufacturing process. In connection with structural components having a complicated geometric configuration it is possible due to the temperature control according to the invention, to assure an optimal resin flow in any location throughout the structural component, including corners and so-called bottle-necks. This is accomplished by increasing the temperature in individual locations. Additionally, the invention makes possible a better wetting of the fibers by the resin by temporarilty substantially decreasing the viscosity of the impregnating resin by an overheating for short durations of time. The invention may be used for this purpose because an excessive heating or an excessive temperature occurs only at the boundary layer between the fiber and the resin. This type of heating was not possible at all by prior art methods without influencing the jelling or curing process in an undesirable manner.

Further advantages of the invention are seen in that the most simple mold may be used, whereby even the most complicated shapes are subject to being properly heated, for example, along cross walls which do not come into contact with the mold at all. Such individualized and localized temperature control was not possible heretofore.

Further, the carbon fibers or the carbon fiber webbings remain in the structural component as a load supporting element, whereby the flow characteristic of the impregnating resin may be individually varied in accordance with the individual requirement of all critical locations within the structural component. Moreover, as mentioned, the molding temperature is substantially lower than in prior art mold heating methods, please see the comparison of FIGS. 2a and 2b. The lower molding temperature also results in lower heat losses so that a heat transport from the outside inwardly into the structural component, and hence a heated mold, has been obviated.

Although the invention has been described with reference to specific example embodiments, it will be appreciated, that it is intended to cover all modifications and equivalents within the scope of the appended claims.

What is claimed is:

1. A method for manufacturing structural components having a given shape, of fiber compound materials including a carbon fiber webbing embedded in an impregnating resin having a given curing temperature, comprising the following steps:
    (a) arranging said carbon fiber webbing on an unheated support mold (14) conforming to at least part of said given shape,
    (b) impregnating said carbon fiber webbing with said resin for embedding the carbon fiber webbing in the resin,
    (c) curing said resin for bonding said resin to said carbon fiber webbing, said curing comprising supplying curing heat internally into said resin by temporarily passing an electric current through said carbon fiber webbing, said electric current being just sufficient to generate inside said resin at least said curing temperature of the resin, and switching off the electric current when said curing is substantially completed, whereby the carbon fiber webbing is permanently embedded in said resin as a reinforcing load supporting element of said structural component, and
    (d) controlling the strength of said electrical current so that the latter is different in different areas of the webbing whereby the intensity of the heating may be adapted to the particular area or configuration of the webbing.

2. The method of claim 1, further comprising securing a strip of electrically conducting material to an edge of said carbon fiber webbing, and connecting electrical terminals to said strip for feeding an electrical current into said carbon fiber webbing.

3. The method of claim 2, wherein said strip of electrically conducting material is a copper channel section having a U-cross-section.

4. The method of claim 1, further comprising supplying said electrical current by means of a low voltage power supply.

5. The method of claim 4, wherein said low voltage power supply has a maximum voltage of about 65 volts.

6. The method of claim 1, wherein said unheated support mold is of electrically conducting material, said method further comprising electrically insulating said carbon fiber webbing from said electrically conducting support mold by interposing an electrically insulating glass fiber webbing between the support mold and the carbon fiber webbing.

7. The method of claim 1, wherein said carbon fiber webbing is preheated already prior to said impregnating by passing an electrical current through the carbon fiber webbing.

8. The method of claim 1 or 7, wherein said carbon fiber webbing is also heated during said impregnation by passing an electric current through the carbon fiber webbing.

9. The method of claim 8, further comprising temporarily overheating the carbon fiber webbing for temporarily decreasing the viscosity of the impregnating resin.

* * * * *

UNITED STATES PATENT AND TRADEMARK OFFICE
CERTIFICATE OF CORRECTION

PATENT NO. : 4,385,957

DATED : May 31, 1983

INVENTOR(S) : Peter Wackerle, Dieter Franz

It is certified that error appears in the above-identified patent and that said Letters Patent is hereby corrected as shown below:

Claim 9, line 1, (column 6, line 60) "claim 8"
should read: --claim 1--.

Signed and Sealed this

Sixteenth Day of August 1983

[SEAL]

Attest:

GERALD J. MOSSINGHOFF

Attesting Officer    Commissioner of Patents and Trademarks